United States Patent [19]

Goglio

[11] Patent Number: 4,518,087

[45] Date of Patent: May 21, 1985

[54] SEALED FLEXIBLE CONTAINER WITH NON-DESTRUCTIVE PEELABLE OPENING

[75] Inventor: Luigi Goglio, Milan, Italy

[73] Assignee: Fres-co System USA, Inc., Telford, Pa.

[21] Appl. No.: 496,770

[22] Filed: May 20, 1983

[51] Int. Cl.³ .............................................. B65D 33/16
[52] U.S. Cl. .................................................... 206/632
[58] Field of Search ................. 206/632, 484; 383/93, 383/94, 95

[56] References Cited

U.S. PATENT DOCUMENTS

| | | | |
|---|---|---|---|
| 3,410,393 | 11/1968 | Lee | 206/632 |
| 3,511,436 | 5/1970 | Kessler | 206/632 |
| 3,511,746 | 5/1970 | Davies | 206/632 |
| 3,595,468 | 7/1971 | Repko | 206/632 |
| 3,613,874 | 10/1971 | Miller | 206/632 |
| 4,145,449 | 3/1979 | Nelham | 206/632 |
| 4,279,344 | 7/1981 | Holloway | 206/632 |

*Primary Examiner*—Stephen P. Garbe
*Attorney, Agent, or Firm*—Caesar, Rivise, Bernstein & Cohen, Ltd.

[57] ABSTRACT

A container formed of a flexible sheet of material capable of being sealed for closing off the interior of the container from the ambient atmosphere. The sheet material is resistant to tearing and includes an inner surface and an outer surface. The container comprises a mouth portion including a peel strip fixedly secured to the inner surface of the material and extending substantially the entire length of the mouth portion with adjacent portions of the peel strip being in releasable engagement with each other. The engagement forms an air-tight interfacial seal at the mouth which is readily openable by peeling the engaging portions of the peel strip means from each other to provide ready access to the interior of the container without tearing the sheet material forming the container. Thus, the container can be readily reclosed by conventional mechanical means, such as folding, tin ties, etc.

The containers are formed in accordance with the method for applying the strips transversely across a web of sheet material and heat sealing the strips to the material at longitudinally spaced locations and thereafter severing the web into sections which are formed into the container.

6 Claims, 5 Drawing Figures

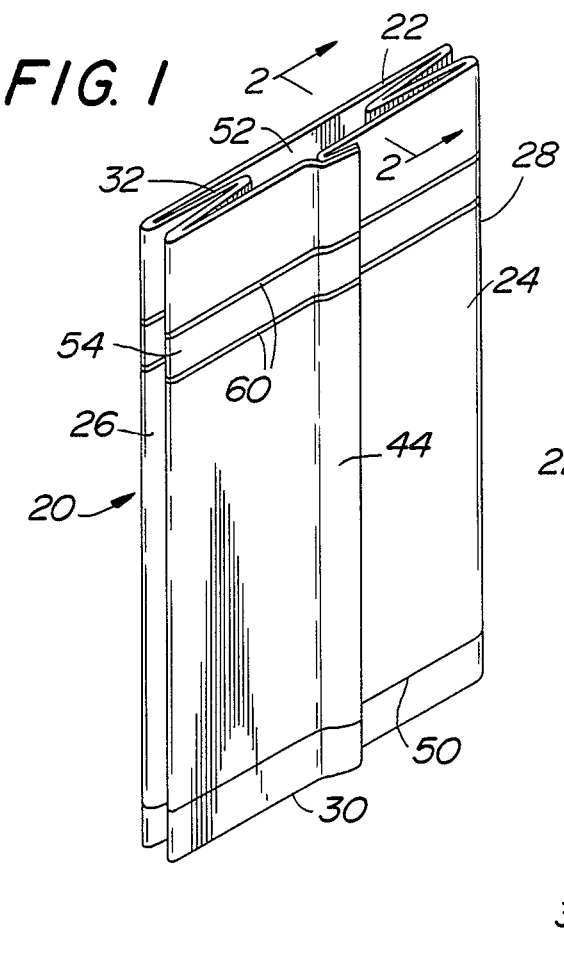
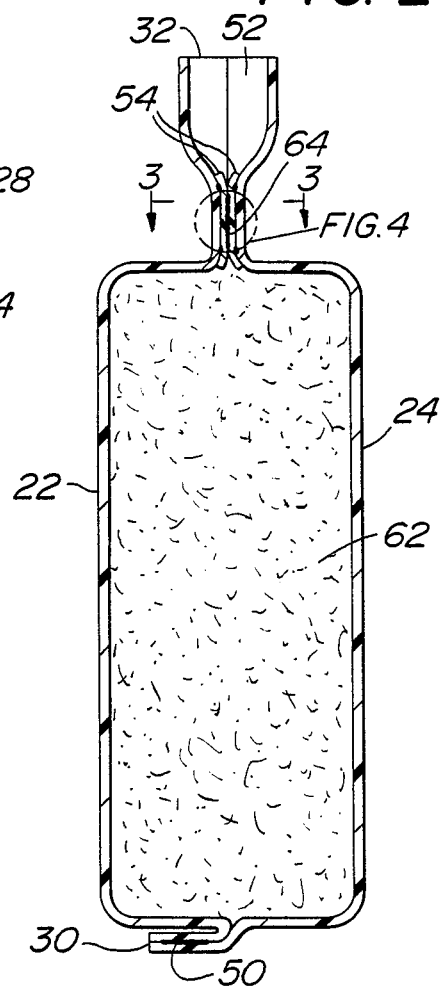
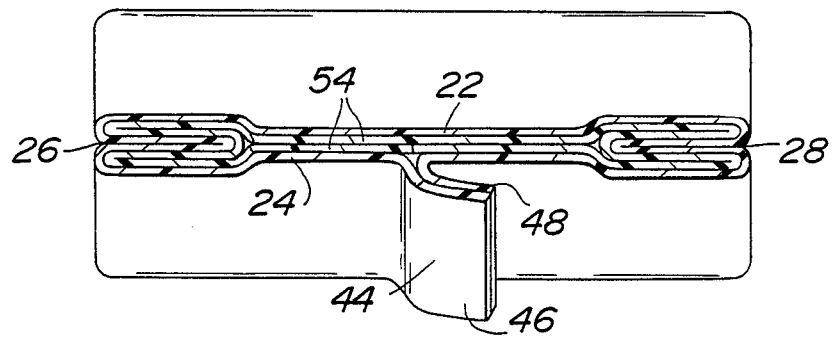

SEALED FLEXIBLE CONTAINER WITH NON-DESTRUCTIVE PEELABLE OPENING

BACKGROUND OF THE INVENTION

This invention relates generally to containers and, more particularly, to containers formed of flexible sheet materials.

Flexible containers formed of sheet materials have been used for several years and are now gaining ever wider acceptance for holding various air-perishable products, e.g., foodstuffs, etc. Prior art flexible, air-tight containers are commonly constructed of some plastic film, metal foil, or combinations thereof, in one or more plies and sealed alone one or more seams. Such containers are usually vacuumized after filling but prior to sealing so that the contents of the container are not exposed to the degradation effects of air. Accordingly, products held in such containers can have a shelf life comparable to rigid containers, such as jars with screw-on lids or metal cans.

The advantages of flexible containers over rigid containers are many. For example, flexible containers can be manufactured at substantially lower cost and can be stored flat, thereby resulting in enormous space savings over rigid containers. Moreover, flexible containers are substantially lighter in weight, thereby resulting in reduced transportation costs for unfilled containers. Further still, flexible containers are generally of an overall parallelopiped shape when filled so that such containers take up considerably less shelf or storage space. Needless to say, this feature is of considerable importance insofar as transportation, storage, and display are concerned.

While prior art air-tight, flexible containers exhibit the aforementioned advantages over rigid containers, they still have not proved a completely acceptable alternative to hard containers for the air-tight storage of materials, particularly when it is desired to be able to open and reclose the container after its initial opening. In this regard, the seams of prior art flexible containers are usually permanent in the interest of air tightness and structural integrity and are commonly formed by conventional heat sealing or welding techniques. Thus, the prior art flexible container is opened by cutting or tearing one or more of its seams. Owing to the permanent nature of the sealed seams, the tearing of any seam to gain access to the contents of the container not only destroys the seal but frequently results in the tearing of the material of the container contiguous with the seam. This is an obviously undesirable result since it may render the container useless for reclosure and continued holding of the contents of the container. If the container is opened by cutting off its top below the heat seal line, while the wall portions forming the container are not torn (thus permitting reclosure), the container is nevertheless shorter and thus of lower volumetric capacity.

Various flexible packaging structures have been disclosed in the prior art utilizing tear strips and/or tear lines to facilitate opening of the container. Examples of such patents are U.S. Pat. Nos. 3,186,628 (Rohde), 3,535,409 (Rohde), and 3,939,972 (Mayworm).

In the U.S. Pat. No. Re. 30,726 (Otten et al.), there is disclosed a pouch composed of an extruded polymer film formed by a blend of polyethylene resin and an ionomer.

The pouch is formed by extruding the polyethylene-/ionomer blend into a continuous tubular film which exhibits a linear tear property in the machine direction. By linear tear property, it is meant that the material has the inherent property to tear readily by hand along the substantially straight line by a normal shearing or parting motion without the need for guiding the tear. The tubular film is then slit longitudinally, cut into transverse sections, and heat sealed adjacent the transverse cuts to form a bag or pouch having an open top end. After the pouch is filled, the open top end is heat sealed to close the pouch. By virtue of the orientation of the film, the resulting pouch exhibits a linear tear property across its top end. To facilitate the opening of the pouch across its top, one edge of the pouch adjacent the top is slit or nicked to provide a starter tear. Thus, opening of the pouch is accomplished by tearing the top off of the pouch.

While such action may be effective to provide ready access to the interior of the pouch, the tearing away of the top portion of the pouch limits the pouch's utility for being reused and reclosed at its top end.

OBJECTS OF THE INVENTION

Accordingly, it is the general object of the instant invention to provide a flexible material container and a method of producing the same which overcomes the disadvantages of the prior art.

It is a further object of the invention to provide a flexible container having an air-tight sealed mouth but which can be readily pulled open without resulting in the destruction of any portion of the container, thereby enabling the container to be reclosed.

It is still a further object of this invention to provide a flexible container having a mouth which is sealed by a peelable interface between abutting wall portions of the container and which interface can be readily peeled open without destroying any portion of the container.

It is still a further object of this invention to provide a flexible container which is resistant to tearing or opening at all portions thereof but which includes a mouth having an air-tight interfacial seal which can be readily peeled open.

It is yet a further object of this invention to provide a method for producing a flexible container having and air-tight sealed mouth which can be readily peeled open without resulting in the destruction of any portion of the container.

It is still a further object of this invention to provide a simple and economically viable method of producing a flexible container which is sealed by a peelable interface between abutting wall portions of the container and which interface can be readily opened without destroying any portion of the container.

SUMMARY OF THE INVENTION

These and other objects of the instant invention are achieved by providing a container and a method for making the container. The container comprises a flexible sheet material capable of being sealed for closing off the interior of the container from the ambient atmosphere. The sheet material is resistant to tearing and includes an inner surface and an outer surface. The container comprises a mouth portion including peel strip means fixedly secured to the inner surface of the material and extending substantially the entire length of the mouth portion. Adjacent portions of the peel strip means are in releaseable engagement with each other to form an air-tight interfacial seal at the mouth. The interfacial seal is readily openable by peeling the engaging portions of the peel strip means from each other to provide ready access to the interior of the container without tearing the sheet material forming the container.

DESCRIPTION OF THE DRAWING

Other objects and many of the attendant advantages of this invention will be readily appreciated as the same becomes better understood by reference to the following detailed description when considered in connection with the accompanying drawings wherein:

FIG. 1 is a perspective view of an exemplary embodiment of a container constructed in accordance with the teachings of the subject invention;

FIG. 2 is an enlarged sectional view of a filled, sealed container, like that shown in FIG. 1, and taken along line 2—2 of FIG. 1;

FIG. 3 is a sectional view taken along line 3—3 of FIG. 2;

DETAILED DESCRIPTION OF THE PREFERRED EMBODIMENT

Figure 4:
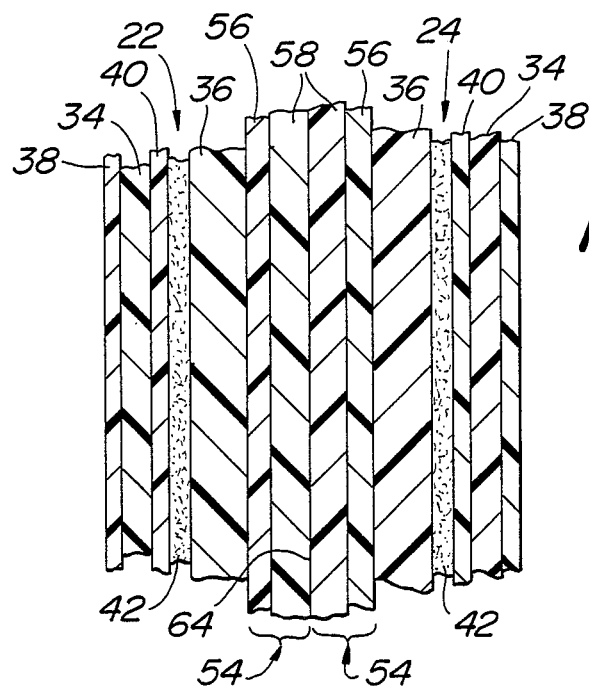
FIG. 4 is an enlarged sectional view of a portion of the container shown within the encircled area in FIG. 2.

Referring now in greater detail to the various figures of the drawing where like reference characters refer to like parts, there is shown generally at 20 in FIG. 1 the container formed of a flexible sheet material constructed in accordance with the instant invention.

The container 20 is formed of a sheet of flexible material, to be described later, and basically comprises a front wall 22, a rear wall 24, a first gussetted side wall 26, a second gussetted side wall 28, a bottom end 30, and a top end 32. The front wall 22, rear wall 24 and gussetted sidewalls 26 and 28 are all integral portions of a single sheet of flexible material which has been folded and seamed as will be described later.

In accordance with the subject invention, the flexible material can be formed of any commercially available flexible material heretofore used for forming flexible packaging. Examples of such materials are polyethylene, polyester, polypropylene, metal foil, and combinations thereof in single or multiple plies.

In the embodiment of the invention disclosed herein, the sheet material forming the front wall 22, back wall 24, and gussetted side walls 26 and 28 of the container 20 are formed of cellophane-polyethylene. It must be pointed out at this juncture that such material is merely exemplary and hence other materials can be used depending upon the desired characteristics for the container.

The exemplary embodiment of the sheet material forming the bag 20 is shown in considerable detail in the sectional view of FIG. 4. As can be seen therein, the sheet material consists of two plies, namely, a cellophane ply 34 and a polyethylene ply 36. The cellophane ply is coated on both sides with polyvinylidene chloride. Thus, the outer surface of cellophane ply 34 includes a polyvinylidene chloride coating 38, while the inner surface includes a polyvinylidene chloride coating 40. The coated cellophane ply 34 is secured to the polyethylene ply 36 via an interposed adhesive layer 42.

As can be seen in FIG. 1, the back wall 24 of the bag 20 includes a longitudinally extending (vertical) seam 44. The seam 44 is formed by the marginal edges 46 and 48 of a section of a web of the material forming the bag and which edges are brought into engagement with one another. The edges 46 and 48 are permanently secured to one another via any conventional sealing technique, such as heat sealing, welding, etc. The bottom end 30 of the bag is also sealed closed along a permanent seam line 50. The seam line 50 is also formed using conventional sealing technique, like that used for the seam 44.

The resulting construction thus consists of a bag or pouch-like container having an open top end or mouth 52. It is through the open top end or mouth that the container is filled.

In accordance with the subject invention, the container 20 includes a peel strip means 54, to be described in considerable detail later, disposed adjacent the mouth for sealing the mouth of the container to enclose the contents therein and protect the contents from the ambient atmosphere. The peel strip means serves as a mechanism which can be readily peeled open without destroying the container to provide ready access to the interior of the container. Thus, the container 20 of the subject invention can be reclosed after its initial opening.

The containers 20 of the instant invention are produced by one of two methods, namely, the manufacture, filling, and sealing of the container in one operation by mechanized equipment, or the manufacture of an empty and unsealed container which is then provided to the end user for filling and subsequent sealing. Both of said methods are a part of the subject invention and will be described in detail later.

As can be seen in FIGS. 1–4, the peel strip means 54 basically comprises a strip of material which is permanently secured to the inside surface of the sheet material forming the front wall, side walls, and back wall of the container 20. The strip 54 is located adjacent the open mouth 52 and thus extends about the entire inner periphery of the container (with the exception of the marginal edges forming seam 44) and is permanently secured thereto.

The strip means 54 is formed of any material which can be secured to itself via heat sealing or welding to provide an air-tight interface, but which can be readily peeled apart at its interface without destroying the material thereof. It has been found that a suitable plastic film for the strip 54 consists of a blend of polyethylene and an ionomer like that sold by E. I. DuPont DeNemours & Company under the trademark "SURLYN 1601" such as described in U.S. Pat. No. Re. 30,726 identified heretofore, and whose disclosure is incorporated by reference herein. Other ionomers disclosed in said patent or other plastic materials having similar characteristics to those disclosed therein may also be used.

In a preferred embodiment of the subject invention, the peel strip means 54 consists of a coextrusion (i.e., a two-layer construction), one layer being a polyethylene-Surlyn blend and the other layer being polyethylene. Thus, as can be seen in FIG. 4, the peel strip means 54 consists of inner ply 56 formed of polyethylene and outer ply 58 formed of a blend of polyethylene-Surlyn. The strip 54 completely encircles the inner surface of the sheet material forming the container adjacent the container's mouth 52 but does not extend into the seam 44 in the interest of maintaining the integrity of the seam 44 when the container is later opened. The peel strip 54 is secured in place on the inner surface of the container adjacent its mouth 52 via a pair of longitudinally extending peripheral heat seals or welds 60. Each heat seal or weld is located parallel and closely adjacent the respective edge of the strip 54 and produced in a conventional manner by means to be described later.

As should thus be appreciated, the completed container as shown in FIG. 1 includes an inwardly directed layer of a peelable polyethylene-Surlyn blend 58 adjacent its mouth. The contiguous surface portions of the peelable layer 58 are disposed opposite each other for engagement with each other to seal the mouth of the bag 20. Accordingly, after the bag is filled with the desired contents 62 and then vacuumized to remove any air from the interior thereof, the opposed peel strip surface portions 58 are brought into engagement with each other (as shown in FIGS. 3 and 4) and heat sealed. This action causes the opposed strip portions 58 to become releaseably secured to one another at an air-tight yet weakened interfacial seal 64 (FIG. 4). This interfacial seal, while air-tight, can be readily peeled open without damaging the strips 58 or the material forming the container's walls 22, 24, 26, and 28. Thus, all that is required to open the container is to apply a force at the top end 32 tending to separate the front wall 22 from the rear wall 24. This action causes the abutting peelable surfaces 58 to readily peel away from each other along the interface 64 in a clean opening and without in any way damaging the walls of the container. Accordingly, one can readily gain access to the interior contents 62 of the container 20. Moreover, inasmuch as the container is intact, albeit open, one can readily reclose the bag (although not with an air-tight seal), by merely bringing the mouth's wall surfaces 22, 24, 26, and 28 into engagement with one another, folding the top edge of those surfaces over and holding the folded edges in place with mechanical means, e.g., a tin tie (not shown) which can be incorporated into the container's walls adjacent the mouth.

In accordance with the preferred embodiment of the invention, the peelable strip means 54 is located a substantial distance below the top of the container to provide the fold or mechanical securement area for reclosure of the container after the peel strip 54 has been opened.

Figure 5:
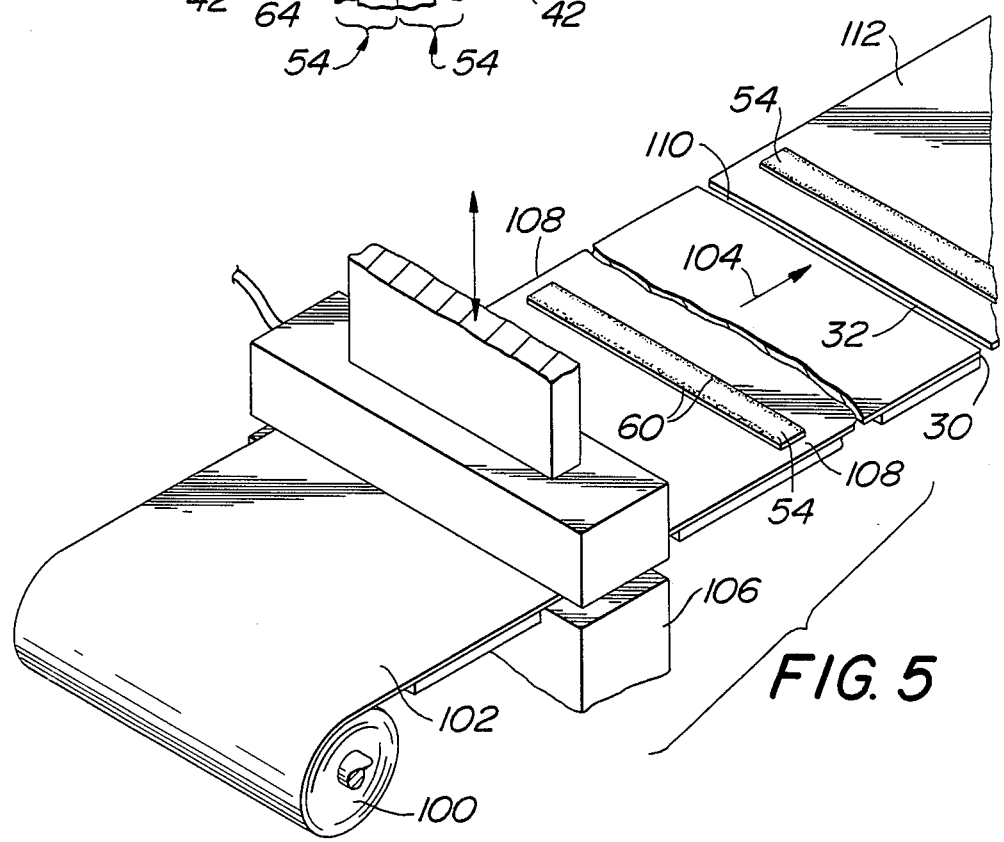
FIG. 5 is a perspective view, greatly simplified, of a system for forming the container shown in FIG. 1.

In FIG. 5 there is shown, in schematic form, apparatus for producing containers constructed in accordance with the instant invention. Accordingly, the container-making system comprises a roll 100 of the sheet material forming the containers walls. The material is reeled off the roll in a web 102, which web is carried longitudinally in the direction of arrow 104 past a peel strip application station 106. The peel strip application station 106 forms only one portion of the entire container-forming system (not shown) and is arranged to apply a plurality of peel strips 54 (like that disclosed heretofore) at equidistantly spaced locations along the web 102 passing thereby. As can be seen in FIG. 5, each strip 54 extends for substantially the entire width of the web 102 except for a marginal edge portion 108 on each side of the strip. The marginal edges portion form the edge portions 46 and 48 of the container's vertical seam 44 (as described heretofore).

Each strip 54 is secured to the web 102 by heat sealing it along the parallel heat seal line 60 at station 106. The web is then severed across its full width at a cut line 110. The cut line 110 serves to divide the web 102 into plural sections 112, each of which is thereafter formed (folded) into the container 20. Thus, the cut line 110 forms the top edge 32 of the section 112 forming one container and a bottom edge 30 of the section 112 forming the next succeeding container. Each cut section 112 of the web is thereafter supplied to apparatus (not shown) which forms the section into a tube and brings the marginal edges 108 of each section into engagement with each other to form and heat seal or weld the seam 44. The resulting tubular construction is thereafter heat sealed or welded along seam 50 adjacent its bottom edge 30 by means (not shown) to complete an open container like that shown in FIG. 1.

At this point, the container 20 may be removed from the system and packaged for supply to a processor for subsequent filling and sealing the containers. Alternatively, the system forming the container may fill it and seal it in one operation. Thus, with the latter system, the container 20, after being formed into the construction shown in FIG. 1, is filled with its contents 62 and vacuumized (by means not shown). The peel strip means 54 is then closed and hermetically sealed, as described heretofore, to isolate the contents 62 within the interior from the ambient atmosphere. The top edge 32 is then folded down or left upright, as desired.

It must be pointed out at this juncture, that while in the preferred embodiment of the invention shown herein the peelable closure 54 comprises a strip which is fixedly secured to the inner surface of the container adjacent its mouth by a pair of seals, this invention is not limited to that construction. Hence, the closure strip can be secured in place by any means. Moreover, the strip need not even by separate from the sheet material forming the container and can thus be applied as a layer or coating strip on the inner surface of the sheet material before it is formed into the container. Further still, the strip need not consist of two plies or layers and thus may be in the form of a single ply or layer or multi-plies or layers of the same or different type materials.

As should be appreciated from the foregoing, the containers of the subject invention provide a viable alternative to the use of rigid containers for the air-tight storage of materials and without the disadvantages of prior art flexible containers, namely either the inability to be readily reclosed due to structural damage to the container due to the tearing of its walls or, if the container is cut open at its seal, the reduction in storage capacity due to the removal of the top of the container. The advantages of the subject invention over the prior are are accomplished in a simple and expeditious manner through the use of a peelable strip closure at the mouth of the container which creates an air-tight weakened seal that can be peeled open without damaging the container itself.

Moreover, the method(s) of the subject invention provides a viable and commercially feasible means for readily and inexpensively producing flexible containers having air-tight peelable mouths.

Without further elaboration, the foregoing will so fully illustrate my invention that others may, by applying current or future knowledge, readily adapt the same for use under various conditions of service.

I claim:

1. A container comprising a flexible sheet material capable of being sealed for closing off the interior of the container from the ambient atmosphere, said sheet material being resistant to tearing, said container having an opposed pair of walls formed by said sheet material, each of said walls including an inner surface and an outer surface, said container comprising a mouth portion formed between said walls and of a predetermined length, each of said walls including a peel strip permanently adhered to the inner surface thereof and extending substantially the entire length of said mouth portion, each of said peel strips comprising a coextrusion of at least two plastic material layers permanently adhered to each other, said peel strips being disposed so that when said container is sealed portions of the same plastic material layer of each of said coextrusions are in releaseable engagement with each other to form an air-tight interfacial seal therebetween, said interfacial seal being readily openable by peeling said engaging portions of said peel strips from each other to provide a clean opening providing ready access to the interior of said container without tearing said sheet material.

2. The container of claim 1 wherein one of said layers of said coextrusion comprises a blend of polyethylene and ionomer.

3. The container of claim 2 wherein said peel strip comprises a first layer of polyethylene and a second layer of said blend of polyethylene and ionomer.

4. The container of claim 1 wherein said peel strip comprises a strip which is heat sealed onto the inner surface of said sheet material.

5. The container of claim 4 wherein one of said layers of said coextrusion comprises a blend of polyethylene and ionomer.

6. The container of claim 5 wherein said peel strip comprises a first layer of polyethylene and a second layer of blend of polyethylene and ionomer.

* * * * *